US011938638B2

(12) United States Patent
Bai et al.

(10) Patent No.: US 11,938,638 B2
(45) Date of Patent: Mar. 26, 2024

(54) SIMULATION DRIVEN ROBOTIC CONTROL OF REAL ROBOT(S)

(71) Applicant: GOOGLE LLC, Mountain View, CA (US)

(72) Inventors: Yunfei Bai, Fremont, CA (US); Tigran Gasparian, Munich (DE); Brent Austin, Munich (DE); Andreas Christiansen, Lengdorf (DE); Matthew Bennice, San Jose, CA (US); Paul Bechard, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 214 days.

(21) Appl. No.: 17/337,815

(22) Filed: Jun. 3, 2021

(65) Prior Publication Data
US 2022/0203535 A1 Jun. 30, 2022

Related U.S. Application Data

(60) Provisional application No. 63/132,582, filed on Dec. 31, 2020.

(51) Int. Cl.
B25J 9/16 (2006.01)

(52) U.S. Cl.
CPC .......... B25J 9/1671 (2013.01); B25J 9/1661 (2013.01); B25J 9/1697 (2013.01)

(58) Field of Classification Search
CPC ...... B25J 9/1671; B25J 9/1661; B25J 9/1697; G05B 2219/32342; G05B 2219/32385; G05B 2219/40311
See application file for complete search history.

(56) References Cited

U.S. PATENT DOCUMENTS 10,792,810 B1 * 10/2020 Beckman ................. B25J 9/163
2017/0334066 A1 11/2017 Levine et al.
(Continued)

FOREIGN PATENT DOCUMENTS

EP 3733355 11/2020

OTHER PUBLICATIONS

European Patent Office; International Search Report and Written Opinion issued in Application No. PCT/US2021/065353; 11 pages; dated Apr. 20, 2022.

Primary Examiner — Adam R Mott
Assistant Examiner — Heather J Keniry
(74) Attorney, Agent, or Firm — Gray Ice Higdon

(57) ABSTRACT

Active utilization of a robotic simulator in control of one or more real world robots. A simulated environment of the robotic simulator can be configured to reflect a real world environment in which a real robot is currently disposed, or will be disposed. The robotic simulator can then be used to determine a sequence of robotic actions for use by the real world robot(s) in performing at least part of a robotic task. The sequence of robotic actions can be applied, to a simulated robot of the robotic simulator, to generate a sequence of anticipated simulated state data instances. The real robot can be controlled to implement the sequence of robotic actions. The implementation of one or more of the robotic actions can be contingent on a real state data instance having at least a threshold degree of similarity to a corresponding one of the anticipated simulated state data instances.

21 Claims, 6 Drawing Sheets

(56) References Cited

U.S. PATENT DOCUMENTS

| | | | |
|---|---|---|---|
| 2020/0249654 A1* | 8/2020 | Edwards | G05B 19/414 |
| 2020/0376675 A1* | 12/2020 | Bai | H04N 23/90 |
| 2021/0078167 A1* | 3/2021 | Khansari Zadeh | B25J 15/0028 |
| 2021/0089040 A1* | 3/2021 | Ebrahimi Afrouzi | G05D 1/0248 |
| 2021/0122046 A1* | 4/2021 | Sun | B25J 9/1661 |
| 2021/0387350 A1* | 12/2021 | Oleynik | A47J 44/00 |
| 2022/0016763 A1* | 1/2022 | Chen | B25J 9/163 |
| 2022/0118618 A1* | 4/2022 | Oleynik | B25J 13/089 |

* cited by examiner

SIMULATION DRIVEN ROBOTIC CONTROL OF REAL ROBOT(S)

BACKGROUND

Use of robotic simulators has been proposed to generate simulated training data that is utilized in training of machine learning model(s). The machine learning model(s), once trained based on simulated training data, can then be utilized during perception, planning, and/or acting stage(s) of robotic control of real robot(s) (i.e., non-simulated physical real-world robot(s)). However, utilization of the machine learning model(s) by the real robot(s) in robotic control does not actively involve robotic simulator(s). Rather, the machine learning model(s) are merely trained based on simulated training data that is generated using the robotic simulator(s). Further, use of robotic simulator(s) has been proposed to test/validate robotic control stacks prior to implementation of the control stacks on real robots. However, once the robotic control stacks are implemented on the real robots, the robotic simulator(s) are no longer actively utilized.

SUMMARY

Implementations disclosed herein are directed to active utilization of a robotic simulator in control of one or more real world robots. The robotic simulator that is utilized in control of a real world robot (also referred to herein as a "real robot") can be implemented utilizing hardware (e.g., processor(s), RAM, and ROM) that is local to the real robot and/or can be implemented utilizing hardware that is remote from, but in network communication with, the real world robot.

In various implementations, a simulated environment of the robotic simulator can be configured to reflect a real world environment (also referred to herein as a "real environment") in which a real robot is currently disposed, or will be disposed. The simulated environment can be configured based on real environment state data that is based on sensor-based observation(s) of the environment. The real environment state data can specify identifiers of objects in the real environment and their poses in the real environment and/or can include raw data from the observation(s) that can be processed to identify the objects and their poses. The simulated environment can be configured based on the identifiers of the objects and their poses. For example, the identifiers of the objects can be utilized to identify matching three-dimensional models of the objects, and the objects positioned in the simulated environment in accordance with their corresponding poses.

The sensor-based observation(s) can include robot-sensor based observation(s) that are from vision component(s) and/or other sensor(s) integrated with the real robot(s) to be controlled. In some of those implementations, the real environment state data includes real environment state data that is generated by the real robot(s), using a perception system, and provided by the real robot(s) to the robotic simulator. The real environment state data can be generated based on the robot-sensor-based observation(s) and/or environment-sensor-based observation(s) (described below). Such perception data can include, for example, a corresponding pose and corresponding object identifier for each of multiple objects in the real environment. The corresponding object identifier can be a higher-level classification such as coffee mug, cup, or bowl or can be more granular identifier such as an identifier of a particular coffee mug or particular cup. Optionally, a more granular identifier of an object can be determined based on a QR code or other coded identifier printed on or affixed to the object. The sensor-based observation(s) can additionally or alternatively include environment-sensor-based observation(s) that are from vision component(s) and/or other sensor(s) that are in the real environment, but not integrated with the real robot(s) to be controlled. For example, the environment-sensor-based observation(s) can include observation(s) from a stand-alone stereo camera or other vision component.

Once the simulated environment is configured to reflect the real environment, the robotic simulator can be used to determine a sequence of robotic actions for use by the real world robot(s) in performing at least part of a robotic task. The robotic task can be one that is specified by a higher-level planning component of the robotic simulator or by real world robot(s), or can be one that is specified based on user interface input. As one non-limiting example, the robotic task can include grasping an object and placing the object in a container, and the part of the task can include grasping the object. As another non-limiting example, the robotic task can include loading a dishwasher and the part of the robotic task can include, repositioning an object, grasping an object to be placed in the dishwasher, or placing an already grasped object in the dishwasher.

In determining the sequence of robotic actions, the robotic simulator can determine the sequence of robotic actions in view of the simulated environment of the robotic simulator and utilizing one or more machine learning models and/or rules that are accessible to the robotic simulator. For example, simulated state data, from the simulated environment, can be applied to the machine learning model(s) and/or to the rule(s) to determine the sequence of robotic actions is a candidate sequence of robotic actions. For instance, the simulated state data that is applied can include simulated image(s) of the simulated environment, such as simulated image(s) that are rendered from the viewpoint of a simulated vision component of a simulated robot (that simulates a real world robot) of the robotic simulator.

In some implementations, the simulated state data that is applied can include simulated state data that simulates real state data that is fully incapable of being captured by any of the robot sensor(s) and/or environment sensor(s) in the real world. For example, the simulated state data can include simulated/synthetic vision data captured from a particular viewpoint (e.g., "overhead") and, absent manual human intervention, there may not be any environmental vision component or robot vision component that is capable of capturing real vision data from a corresponding viewpoint in the real world. It is noted that even though there is no real world vision component capable of capturing real vision data from the corresponding viewpoint, the simulated vision data will still reflect the real world in view of the simulated environment being configured based on the real world and utilizing three-dimensional object model(s). As yet another example, the simulated state data can include simulated LIDAR data and there may not be any LIDAR vision components in the real world. In these and other manners, the robotic simulator can be utilized to generate simulated state data that lacks any real world counterpart, and utilize such simulated state data in determining the sequence of robotic actions. Utilizing such simulated state data can result in more robust and/or more accurate determination of a sequence of robotic actions in various scenarios. As one example, it can enable utilization of additional and/or alternative machine learning model(s), such as those tailored to such simulated state data). As another example, it can enable application of multiple disparate simulated state data instances to machine learning model(s) and/or rule(s), to enable determining a sequence of actions based on the multiple disparate simulated state data instances collectively.

In some additional or alternative implementations, the simulated state data that is applied can include simulated state data that is capable of being captured by one or more of the robot sensor(s) and/or environment sensor(s) in the real world, but is only capable of being captured if power is consumed in traversing pose(s) of those real world sensor(s) and/or in repositioning environmental object(s). For example, the simulated state data that is applied can include a simulated 3D point cloud of an object. Vision component(s) of the real robot may be capable of capturing data to generate a counterpart real 3D point cloud, but only if the real robot consumes a significant amount of power in traversing fully around the object and/or in lifting and rotating the object. On the other hand, the robotic simulator can generate the simulated 3D point cloud of the object with less power consumption. As another example, the simulated state data instance that is applied can include multiple simulated images, each being from a different viewpoint. Vision component(s) of the real robot may be capable of capturing counterpart real images from corresponding different viewpoints, but only if the real robot consumes a significant amount of power in traversing the vision component(s) to the different viewpoints. On the other hand, the robotic simulator can render simulated images from the different viewpoints with less power consumption.

In some implementations, the candidate sequence of robotic actions can be applied to the simulated robot of the robotic simulator and in the simulated environment, and further simulated state data from during and/or after the applying can be utilized to determine whether the candidate sequence of robotic actions should be determined as a sequence of robotic actions to be provided for use by the real world robot(s). Optionally, multiple candidate sequences of robotic actions can be considered, each applied in the robotic simulator, and corresponding further simulated data for each utilized in determining which should be the determined sequence of robotic actions to be provided for use by the real world robot(s).

As one example, one or more features of the further simulated state data can be analyzed to determine whether a candidate sequence of robotic actions should be determined as a sequence of robotic actions to be provided for use by the real world robot(s). For instance, the feature(s) can include a task success feature that indicates whether the part of the task was successful (e.g., if the part of the task is grasping an object, does the simulated state data indicate a simulated representation of the object was grasped by applying the sequence of robotic actions). In such an instance, the candidate sequence of robotic actions can be determined as a sequence of robotic actions to be provided for use only if the task success feature indicates success of the part of the task. Also, for instance, the feature(s) can include efficiency feature(s) such as efficiency feature(s) that indicate a quantity of robotic actions in the sequence and/or a distance traversed by component(s) of the robot in performing the sequence of robotic actions (e.g., a cumulative distance, in joint space, traversed by joint(s) of the robot and/or a distance, in task space, traversed by an end effector of the robot). In such an instance, the candidate sequence of robotic actions can be determined as a sequence of robotic actions to be provided for use only if the efficiency feature(s) satisfy absolute and/or relative threshold(s), such as a relative threshold that is based on the efficiency feature(s) of alternate candidate sequences of actions being considered. It is noted that for some sequences of robotic actions, the efficiency feature(s) cannot be known without applying them in simulation. For example, a sequence of robotic actions can be determined using a machine learning model and determining downstream action(s) in the sequence can be dependent on processing simulated state data that is influenced by performance of upstream action(s) in the sequence.

Various technical benefits can be achieved by analyzing further simulated state data from during and/or after applying the sequence of robotic actions in simulation, and only providing the sequence of robotic action(s) for implementation by real robot(s) if the analysis satisfies certain condition(s). As one example, when task success feature(s) are considered, a likelihood that the real robot will successfully perform the part of the task is increased. This can prevent waste of energy in controlling the real world robot(s) to perform actions that will not lead to successful performance of the part of the task and/or can prevent unnecessary wear and tear on the real world robot(s) that would otherwise result from performing actions that will not lead to successful performance of the part of the task. As another example, when efficiency feature(s) are considered, the real robot can perform the part of the task in a shorter duration of time and/or with lesser movement of component(s). As yet another example, the robotic simulator can apply the sequence of robotic actions, in simulation, in less clock-on-the-wall time than can the real robot. This enables quicker determination of an unsuccessful or otherwise suboptimal sequence of robotic actions in a shorter duration of time than if the real robot were instead controlled to implement the suboptimal sequence of robotic actions, and resulting real-world state data analyzed to determine the sequence of robotic actions is suboptimal.

It is noted that, absent utilizing a robotic simulator as described herein, these and other technical benefits would not be achievable in various implementations. As one example, assume a utilized machine learning model indicated a first sequence of robotic actions as most likely to successfully achieve the part of the task and a second sequence of robotic actions as second most likely to successfully achieve the part of the task. Further assume that by applying the first and second sequences in simulation, and analyzing the corresponding further simulated state data, it is determined that the second sequence resulted in successful performance of the part of the task in simulation, whereas the first sequence did not. As a result, the second sequence of robotic actions can be provided for implementation by the real robot. Absent utilization of the robot simulator, the non-successful first sequence of robotic actions would have been chosen and implemented as a result of the machine learning model indicating them as more likely to be successful.

After a sequence of robotic actions is determined using the robotic simulator, the real robot can be controlled to implement the sequence of robotic actions. For example, each of the robotic actions can indicate, directly or indirectly, corresponding control command(s) to be implemented at a corresponding time step, and the corresponding control commands implemented in sequence and at the corresponding time steps. Implementing the control commands can include sending the control commands to corresponding actuator(s) of the real robot.

As mentioned above, in some implementations the sequence of robotic actions are applied in the robotic simulator prior to implementation of the sequence by the real robot. In some of those implementations, a sequence of simulated state data instances is generated based on simulated data from the robotic simulator during application of the sequence of robotic actions. Each of the simulated state data instances defines, for a corresponding point in the sequence of robotic actions, corresponding anticipated environmental state data for the corresponding point and/or corresponding anticipated robot state data for the corresponding point. In those implementations, each of the sequence of simulated state data instances can be compared to corresponding real state data instances during implementation of the sequence of robotic actions. Each of the real state data instances defines, for a corresponding point in the sequence of robotic actions, real environmental state that is based on one or more updated sensor-based observations of the real environment (e.g., robot-sensor-based and/or environmental-sensor-based) and/or real robot state data that is based on one or more sensor-based observations of the real robot. It is noted that the simulated state data instances can each be captured from the perspective of simulated sensor(s) (e.g. simulated vision component(s)) that correspond to real world sensor(s) (robot and/or environment) to enable comparisons described herein.

Each of the simulated state data instances can be compared to corresponding real state data instances to determine if there is a threshold degree of similarity between them. If there is a threshold degree of similarity, this can indicate that the implementation of the robotic actions on the real robot is influencing the real environment in a manner that is consistent with their influence on the simulated environment when implemented in simulation. This can additionally or alternatively indicate that the real environment is in a state that corresponds to the simulated environmental state. For example, it can indicate that no unanticipated objects have been introduced to the environment and/or that no anticipated objects have been removed from the environment. Yet further, this can additionally or alternatively indicate that implementation of the robotic actions on the real robot is influencing the real robot in a manner that is consistent with their influence on the simulated robot when implemented in simulation.

A simulated state data instance for a point can be compared to a corresponding real state data instance for the point, and compared prior to implementation, on the real robot, of robotic action(s) of the sequence that follow that point. Implementation of the robotic action(s) that follow that point can be contingent on the comparison indicating the threshold degree of similarity. If the comparison indicates the threshold degree of similarity is not present, control of the real robot based on the sequence of robotic actions can be halted. This can prevent the real robot from continuing to implement the robotic actions of the sequence in situations where environmental conditions have changed. Accordingly, energy is not wasted in continuing to control the real robot and/or damage to the real robot and/or environmental objects is avoided. Optionally, when control of the real robot based on the sequence of robotic actions is halted, updated real environment state data is utilized to reconfigure the simulated environment of the robotic simulator, and the robotic simulator utilized to determine an updated sequence of robotic actions to implement based on the reconfigured simulated environment. The updated sequence of robotic actions can then be utilized in controlling the real robot. Further, an updated sequence of simulated state data instances can be provided with the updated sequence of robotic actions to again enable comparison to corresponding real state data instances to ensure threshold degrees of similarity between the two before fully implementing the updated sequence.

As one particular example, each of the simulated state data instances can include corresponding anticipated environmental state data that is based on a corresponding rendered image, rendered from a point of view of a simulated vision component of the simulated robot (that corresponds to a real vision component of the real robot). For instance, the environmental state data for a simulated state data instance can include a segmentation mask of a corresponding rendered image and/or an embedding of the corresponding rendered image (e.g., an embedding generated based on processing the rendered image using an encoder). Accordingly, the environmental state data can provide an indication of the anticipated environmental state at the corresponding point in the sequence of robotic actions. Further, each of the real state data instances can include corresponding real environmental state data that is based on a corresponding real image from the real vision component of the robot. For instance, the real environmental state data for a real state data instance can include a segmentation mask of a corresponding real image and/or an embedding of the corresponding real image (e.g., an embedding generated based on processing the real image using an encoder). Continuing with the example, an instance of anticipated environmental state data can be compared to a corresponding instance of real environmental state data prior to implementing robotic action(s) of the sequence that follow the point corresponding to those instances. For instance, an anticipated segmentation mask can be compared to a real segmentation mask (e.g., by determining difference(s) between the sizes and/or position(s) of the segmentation masks) to determine if there is a threshold degree of similarity between the two. Also, for instance, an anticipated embedding can be compared to a real embedding (e.g., by determining a distance in embedding space between the two) to determine if there is a threshold degree of similarity between the two. Utilizing segmentation masks, embeddings, and/or other non-pixel level abstractions of vision data can be more robust to the reality gap that may be present between rendered vision data from simulation and real vision data. For example, utilization of such abstractions can be more robust to the reality gap than is comparing pixels of vision data directly.

The comparisons between the simulated stated data instances and the real state data instances can be performed by the robotic simulator (e.g., based on real state data instances provided by the real robot) and/or by the real robot (e.g., based on simulated state data instances provided by the robotic simulator).

In various implementations, the sequence of robotic actions being determined by the robotic simulator and/or implemented by the real robot at a given time is for only part of a task to be implemented by the real robot. In those implementations, the robotic simulator can be utilized to determine a next sequence of robotic actions to be implemented for performing another part of the task, and that next sequence of robotic actions implemented by the real robot following implementation of the sequence of robotic actions. This process can continue until all sequences of robotic actions necessary to complete the task have been determined and implemented. Accordingly, the robotic simulator can effectively be in the control loop for the real robot, continuously providing updated sequences of robotic actions for use by the real robot.

In some of those implementations, the next sequence of robotic actions can be determined, by the robotic simulator, prior to full implementation of the sequence of robotic actions by the real robot. In various situations, the next sequence of robotic actions can be determined based on the simulated environment as it has progressed in the robotic simulator. For example, the simulated environment as it has progressed can be utilized when comparisons between simulated state data instances and real state data instances, for thus far implemented robotic actions, satisfy the threshold degree of similarity. In various other situations, the next sequence of robotic actions can be determined based on a reconfigured simulated environment that has been reconfigured based on updated real environment state data. For example, the simulated environment can be reconfigured responsive to determining the threshold degree of similarity is not satisfied, as described above.

Various technical benefits have been mentioned above that can be achieved according to techniques described herein. In addition to, or instead of, such benefits, techniques described herein can enable more robust planning of robotic actions and/or more power-efficient utilization of a real robot. For example, in implementations where the robotic simulator is implemented by hardware that is remote from a real robot, planning can be performed, by the robotic simulator, for robotic actions to be implemented on the real robot. This can enable more robust planning on a real robot with limited hardware capabilities. For example, the robotic simulator can utilize, in planning, machine learning model(s) that require GPU(s) and/or CPU(s) that may be available to the robotic simulator but not present on the real robot. Performing planning on the remote robotic simulator can additionally or alternatively preserve limited battery life on battery powered real robots, as the real robots need not utilize processor cycles and/or other power-resource intensive resources for planning.

The above description is provided as an overview of only some implementations disclosed herein. These and other implementations are described in more detail herein, including in the detailed description, the claims, and in the appended paper.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
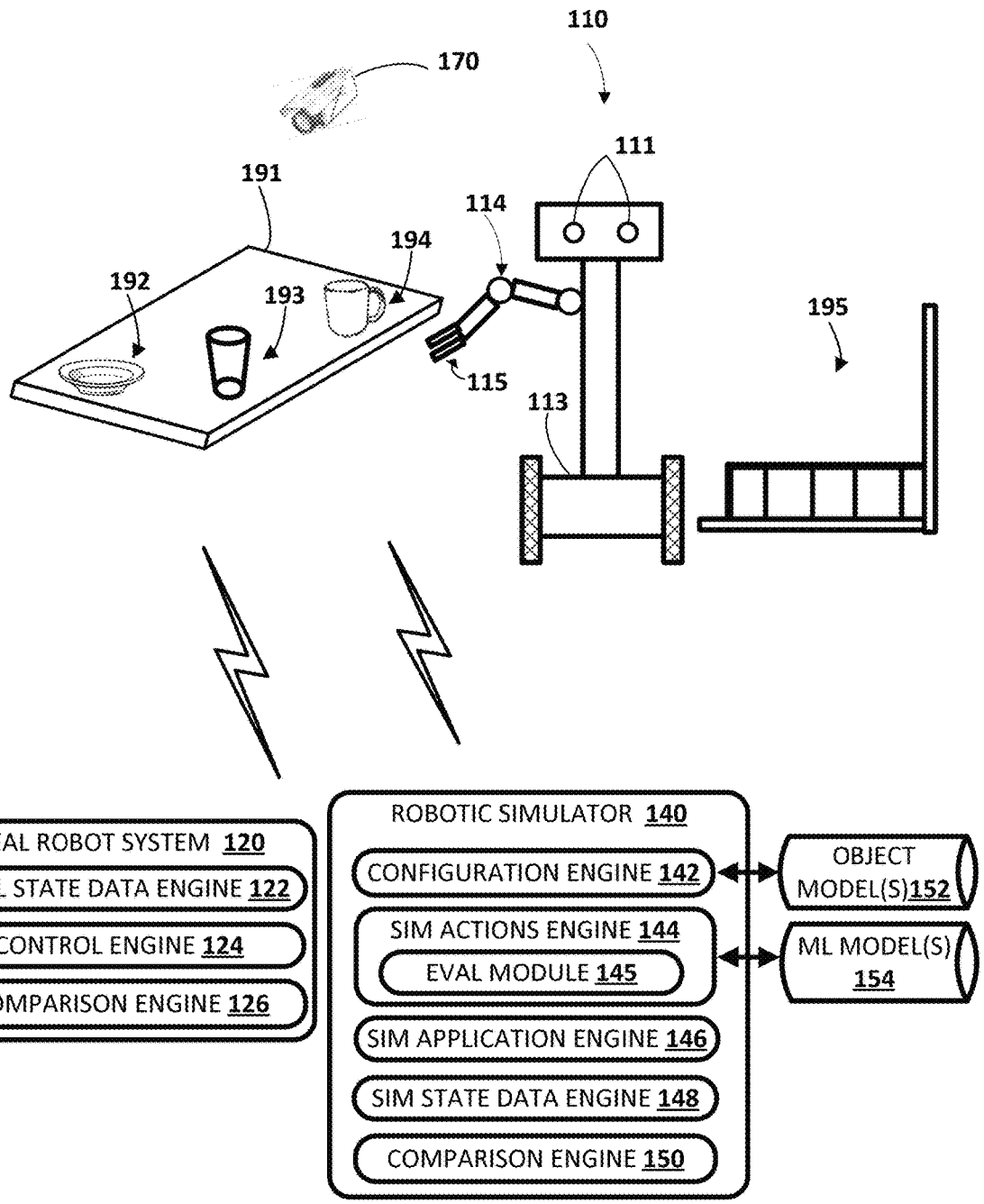
FIG. 1 illustrates an example environment in which implementations disclosed herein can be implemented.

FIG. 1 illustrates an example environment in which implementations disclosed herein can be implemented. The example environment includes a robot 110 and a dishwasher 195. The example environment also includes a bowl 192, a 195. The example environment also includes a bowl 192, a cup 193, and a coffee mug 194 resting on a table 191. The example environment of FIG. 1 can be a real world environment in which robot 110 can utilize techniques described herein, in performing various tasks such as those that involve manipulating one or more of the objects 191-195. For example, the task can include pushing, grasping, or otherwise manipulating one or more of the objects 191-195. As another example, the task can include a more complex task such as loading each of the objects 191-194 into the dishwasher 195.

The robot 110 illustrated in FIG. 1 is a particular mobile robot. However, additional and/or alternative robots can be utilized with techniques disclosed herein, such as additional robots that vary in one or more respects from robot 110 illustrated in FIG. 1. For example, a mobile forklift robot, a robot arm, an unmanned aerial vehicle ("UAV"), and/or a humanoid robot can be utilized instead of, or in addition to robot 110, in techniques described herein.

Robot 110 includes a base 113 with wheels provided on opposed sides thereof for locomotion of the robot 110. The base 113 may include, for example, one or more motors for driving the wheels of the robot 110 to achieve a desired direction, velocity, and/or acceleration of movement for the robot 110.

Robot 110 also includes a vision component 111 that can generate images related to shape, color, depth, and/or other features of object(s) that are in the line of sight of the vision component 111A. The vision component 111 can be, for example, a monographic camera (e.g., generating 2D RGB images), a stereographic camera (e.g., generating 2.5D RGB-D images), and/or a laser scanner (e.g., LIDAR generating a 2.5D depth (D) image or point cloud). The robot 110 also includes robot arm 114 with an end effector 115 that takes the form of a gripper with two opposing "fingers" or "digits."

Robot 110 also includes one or more processors that, for example: implement robotic actions (e.g., by providing corresponding control commands to actuators and/or other operational components thereof); determine poses and/or identifiers of objects based on vision component data; and optionally implement a robotic simulator. For example, one or more processors of robot 110 may implement all or aspects of method 200 of FIG. 2. Additional description of some examples of the structure and functionality of various robots is provided herein.

The example environment of FIG. 1 also includes one or more environmental vision components 170 that are not coupled to or otherwise integrated with the robot 110. Further, the example environment includes a real robot system 120, a robotic simulator 140, object model(s) database 152, and one or more machine learning (ML) models 154.

The real robot system 120 is implemented by one or more processors of the robot 110. In FIG. 1, the real robot system 120 is illustrated with a real state data engine 122, a control engine 124, and an optional comparison engine 126. Additional engines can be included in the real robot system 120 in various implementations.

The real state data engine 122 processes sensor-based observations to generate real environment state data described herein and/or to generate real state data instances described herein. In generating the real environment state data and/or the real state data instances, the real state data engine 122 can process the sensor-based observations utilizing one or more locally stored machine learning models (not illustrated).

As one example, the real state data engine 122 can process vision data (from vision component 111 and/or from vision component(s) 170), using machine learning model(s), to generate real environment state data that includes pose(s) and/or classification(s) for object(s) in the environment of the robot 110. As another example, the real state data engine 122 can process vision data, using machine learning model(s), to generate pose(s) for object(s) in the environment and can separately process the vision data to determine granular identifier(s) for the object(s), such as identifier(s) that are reflected in labels that are affixed to the object(s) and that are captured in the vision data. The real environment state data can be provided, by real robot system 120, to the robotic simulator 140 and used by a configuration engine 142 of the robotic simulator in configuring (i.e., initially configuring or reconfiguring) a simulated environment of the robotic simulator 140.

As another example, the real state data engine 122 can process vision data (from vision component 111 and/or from vision component(s) 170), using machine learning model(s), to generate real state data instances that each include a corresponding segmentation mask and/or a vision data embedding. The real state data instances can be used, by a comparison engine 126 of the real robot system 120 or a comparison engine 150 of the robotic simulator 140, in comparing real state data instances to corresponding simulated state data instances to determine if there is a threshold degree of similarity between the real and simulated state data instances. The real state data engine 122 can, in various implementations, include a perception system and/or implement block 252A of method 200 of FIG. 2.

The control engine 124 implements robotic actions that are determined by a simulated actions engine 144 of the robotic simulator 140. Implementing a robotic action can include sending corresponding control command(s) to corresponding actuator(s) of the robot 110, where the control command(s) are directly or indirectly indicated by the robotic actions.

The comparison engine 126 can, during implementation of a sequence of robotic actions by control engine 124, compare real state data instances (from real state data engine 122) for corresponding points during the implementation to simulated state data instances (from simulated state data engine 148 of the robotic simulator 140) to determine if there is a threshold degree of similarity between the compared real and simulated state data instances. The comparison engine 126 can be in communication with the control engine 124 and can cause the control engine 124 to continue to implement robotic actions provided by the robotic simulator so long as comparisons indicate the threshold degree of similarity. The comparison engine 126 can additionally or alternatively cause the control engine 124 to halt implementation of robotic actions provided by the robotic simulator when one or more comparisons do not indicate the threshold degree of similarity. For example, the comparison engine 126 can cause the control engine 124 to halt implementation when a single comparison does not indicate the threshold degree of similarity or when two or more comparisons do not indicate the threshold degree of similarity, such as N sequential comparisons or N out of the last N+M comparisons, where N is an integer greater than one and M is an integer. The comparison engine 126 can, in various implementations, implement block 262 and/or block 264 of method 200 of FIG. 2.

The robotic simulator 140 is implemented by one or more hardware components (e.g., processor(s)) of the robot 110 or is implemented by one or more computing devices that are separate from, but in network communication with, the robot 110. For example, the computing device(s) can be in network communication with the robot 110 via a local area network and/or a wide area network. The robotic simulator 140 is used to simulate an environment that includes corresponding environmental object(s), to simulate a robot operating in the simulated environment (e.g., to simulate robot 110 and/or other robot(s)), to simulate responses of the simulated robot in response to virtual implementation of various simulated robotic actions, and to simulate interactions between the simulated robot and the simulated environmental objects in response to the simulated robotic actions. Various simulators can be utilized, such as physics engines that simulate collision detection, soft and rigid body dynamics, etc. One non-limiting example of such a simulator is the BULLET physics engine.

The robotic simulator 140 includes a configuration engine 121, a simulated actions engine 144 with an optional evaluation module 145, a simulated application engine 146, a simulated state data engine 148, and a comparison engine 150.

The configuration engine 121 configures various parameters for a simulated environment of the robotic simulator 140 and/or configures various parameters for a simulated robot of the robotic simulator 140. In configuring the simulated environment, the configuration engine 121 utilizes real environment state data. In some implementations, the real environment state data can include pose(s) and/or object identifier(s) provided by real state data engine 122 of real robot system 120 and/or by real state data engine(s) of other robot(s) in the environment (unillustrated). In some implementations, the real environment state data additionally or alternatively includes raw sensor-based observation(s), such as vision data from vision component 111 of robot 110 and/or vision data from environmental vision component(s) 170. In those implementations, the configuration engine 121 can include a perception system and can generate, for example, pose(s) and/or object identifier(s) of objects based on the sensor-based observations.

In configuring the simulated environment, the configuration engine 142 can access object model(s) database 152 to identify three-dimensional (3D) model(s) for utilization in the simulated environment. For example, the object model(s) database 152 can include accurate 3D models for some or all objects in the environment, and the configuration engine 142 can match 3D models to corresponding objects using, for example, object identifier(s). For instance, the bowl 192 can include an identifier (e.g., QR code or other identifier) thereon and the real environment state data can reflect that identifier as well as a pose for that identifier. The configuration engine 142 can utilize the identifier to retrieve, from object model(s) database 152 (e.g., it can be indexed based on identifiers), a 3D model for the bowl 192 and can place the 3D model in the simulated environment based on the pose.

In some implementations, configuring the simulated environment can also include configuring a simulated robot to reflect the robot 110 and/or to reflect its current state in the real environment. In such implementations, the real state data engine 122 can provide real environment state data that includes an identifier of the robot 110 and/or a current state of the robot 110 in the real environment, such as current pose for each of the joints of the robot. In configuring the simulated robot, the configuration engine 142 can utilize a robot model. The robot model can define the physical construct of the simulated robot, as well as constraints of the simulated robot, a dynamic model of the simulated robot, and/or other parameter(s) of the simulated robot. The configuration engine 121 can, in various implementations, implement all or aspects of block 252 and/or block 272 of method 200 of FIG. 2.

The simulated actions engine 144 can determine, based on a simulated environment configured by configuration engine 142, a sequence of robotic actions for use by the robot 110 (and/or other unillustrated robot(s)) in performing at least part of a robotic task. In determining the sequence of robotic actions, the simulated actions engine 144 can determine the sequence of robotic actions in view of the simulated environment and utilizing one or more machine learning models 154 and/or rules that are accessible to the robotic simulator. As one example, the machine learning model(s) 154 can include a policy model that is trained utilizing reinforcement or imitation learning, and the simulated actions engine 144 can determine a sequence of robotic actions by applying simulated data to the policy model to generate a probability distribution over robotic actions, and choosing the sequence of robotic actions based on the probability distribution. It is noted that in choosing each next robotic action the simulated data can reflect a new state of the simulated environment and/or of the simulated robot, where the new state reflects the rolling out of the prior robotic actions in the simulation (e.g., rolling out by the simulated application engine 146). As another example, the machine learning model(s) 154 can include a machine learning model that can be used, at each time step, to process current simulated vision data and corresponding candidate robotic action, to generate a value that reflects a likelihood that implementing the candidate robotic action will result in successful performance of at least part of a task. Multiple candidate robotic actions can be considered by the simulated actions engine 144 at each time step, and one selected, for including in a sequence of robotic actions, based on the generated values. It is noted that in choosing each next robotic action the simulated data can reflect a new state of the simulated environment and/or of the simulated robot, where the new state reflects the rolling out of the prior robotic actions in the simulation.

In some implementations, the simulated actions engine 144 generates multiple candidate sequences of robotic actions and determines which should be the determined sequence of robotic actions to be provided for use by the robot 110. In some versions of those implementations, an evaluation module 145 of the simulated actions engine 144 is utilized to evaluate the candidate sequences of robotic actions, and to determine, based on the evaluation, only one of those candidate sequences to provide for use by the robot 110. In some versions of those implementations, the simulated application engine 146 can apply each of the candidate robotic actions to the simulated robot of the robotic simulator and in the simulated environment. Further, the simulated state data engine 148 can generate simulated state data from during and/or after the applying, and the evaluation module 145 can utilize the simulated state data in evaluating one or more candidate sequences.

As one example, the evaluation module 145 can utilize the simulated state data for a sequence to generate a task success feature that indicates whether the part of the task, intended to be implemented by the sequence, was successful. For example, if the part of the task is grasping an object, the evaluation module 145 can generate the task success feature based on whether the simulated state data indicates a simulated representation of the object was grasped by applying the sequence of robotic actions. In such an example, the evaluation module 145 can determine that the sequence is one to be provided for use by the robot 110 only if the task success feature indicates success of the part of the task.

As one example, the evaluation module 145 can utilize the simulated state data for a sequence to additionally or alternatively generate efficiency feature(s) that indicate a quantity of robotic actions in the sequence and/or a distance traversed by component(s) of the robot in performing the sequence. The distance can be, for example, a cumulative distance, in joint space, traversed by joint(s) of the simulated robot and/or a distance, in task space, traversed by an end effector of the simulated robot. In such an example, the evaluation module 145 can determine that the sequence is one to be provided for use by the robot 110 only if the efficiency feature(s) satisfy absolute and/or relative threshold(s). The simulated actions engine 144 can, in various implementations, implement all or aspects of block 256 of method 200 of FIG. 2.

The simulated application engine 146 can apply a sequence of robotic actions to the simulated robot and in the simulated environment. This causes the simulated robot to move in accordance with the robotic actions and the simulated environment to be impacted by at least some of the robotic actions. As mentioned, the simulated application engine 146 can optionally apply multiple different candidate sequences of robotic actions to, for example, generate simulated state data for utilization by the evaluation module 145 in evaluating the multiple different candidate sequences. In those situations, the simulated application engine 146 can apply each of the different candidate sequences with the same starting environmental and robot state, but roll out simulation separately for each and in accordance with the corresponding applied robotic actions. The simulated application engine 146 can, in various implementations, implement all or aspects of block 256 of method 200 of FIG. 2.

The simulated state data engine 148 can generate simulated state data for an application of robotic actions by the simulated application engine 146. The generated simulated state data can include data utilization by the evaluation module 145 and/or can include simulated state data instances for utilization by the comparison engine 126 and/or by the comparison engine 150. For example, for a sequence of robotic actions applied by the simulated application engine 146, the simulated state data engine 148 can generate a sequence of simulated state data instances based on simulated data from the robotic simulator during application of the sequence of robotic actions. For example, the simulated state data engine 148 can generate an initial simulated state data instance prior to application of any of the robotic actions of a sequence and can generate a simulated state data instance after application of each of the robotic actions, after application of every other of the robotic actions, after application of every third of the robotic actions, or at other frequency. Each of the simulated state data instances defines, for a corresponding point in the sequence of robotic actions, corresponding anticipated environmental state data for the corresponding point and/or corresponding anticipated robot state data for the corresponding point. The simulated state data engine 148 can, in various implementations, implement all or aspects of block 256A and/or of block 258 of method 200 of FIG. 2.

The comparison engine 150 can share one or more aspects in common with the comparison engine 126 of real robot system 120 described above. In various implementations, only one of the comparison engine 126 and the comparison engine 150 is provided and the other is omitted. In implementations where the comparison engine 150 is included, it can obtain real state data instances from real state data engine 122 and compare those to simulated state data instances generated by simulated state data engine 148. In implementations where the comparison engine 126 is included, it can obtain simulated state data instances from simulated state data engine 148 and compare those to real state data instances generated by real state data engine 122. The comparison engine 150 can, in various implementations, implement all or aspects of block 262 and/or of block 264 of method 200 of FIG. 2.

Figure 2:
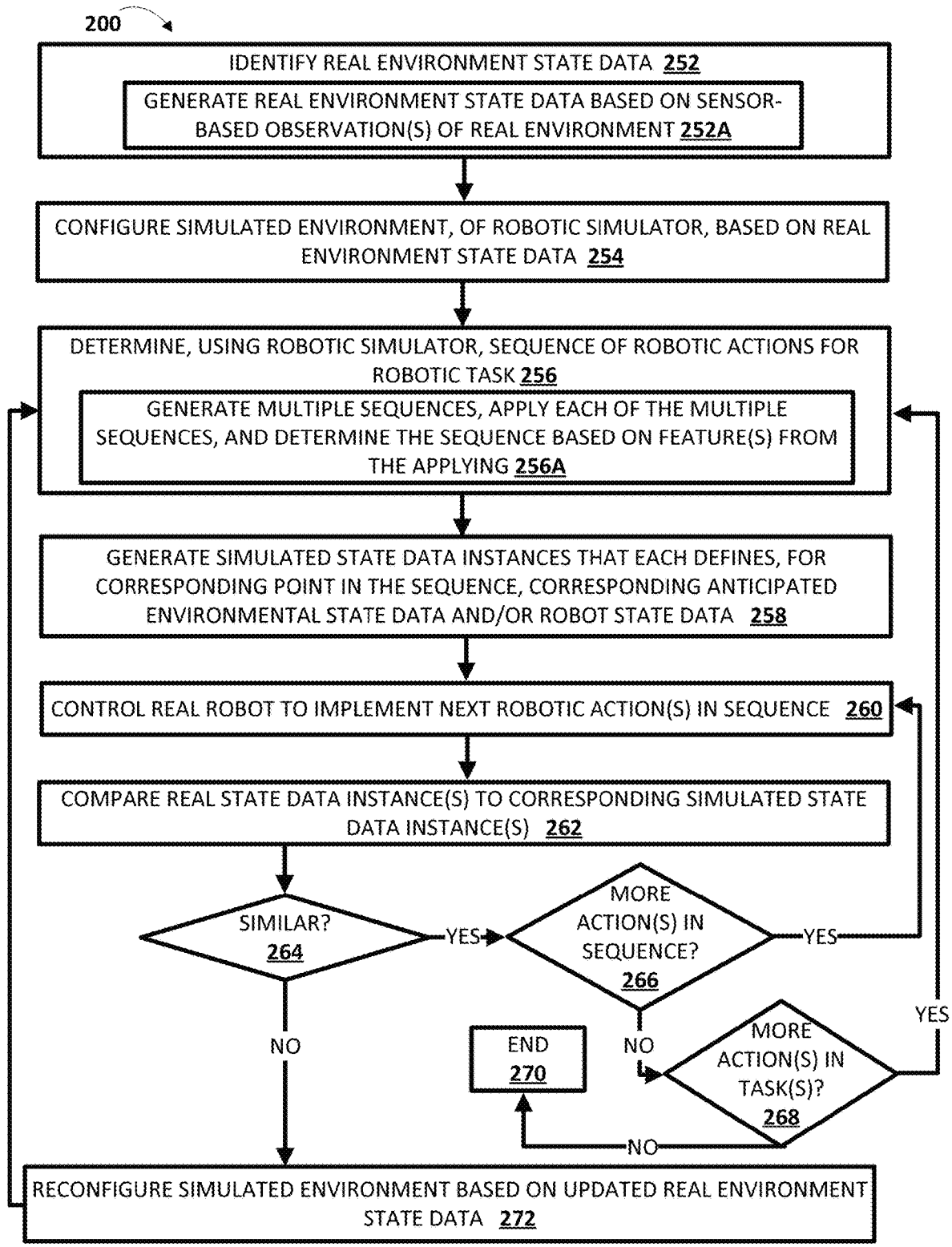
FIG. 2 is a flowchart illustrating an example method of simulation driven robotic control of a real robot, according to various implementations disclosed herein.

Additional description of various components of FIG. 1, and the interactions that can occur between those components, is described below with respect to FIG. 3 and FIG. 4. However, first, method 200 of FIG. 2 is described, which illustrates an example method of simulation driven robotic control of a real robot, according to various implementations disclosed herein. For convenience, the operations of the flowcharts are described with reference to a system that performs the operations. This system may include one or more components (e.g., processor(s)) of a robot and/or of computing device(s) in network communication with a robot. Moreover, while operations of method 200 are shown in a particular order, this is not meant to be limiting. One or more operations may be reordered, omitted or added.

At block 252, the system identifies real environment state data. The real environment state data is based on sensor-based observation(s) of a real environment. The sensor-based observation(s) are from real sensor(s) in the real environment, such as sensor(s) of real robot(s) in the real environment and/or sensor(s) that are in the real environment but not part of the real robot(s). The real environment state data can include, for example, pose(s) of real object(s) in the real environment, object identifier(s) of the real object(s), and/or sensor-based observation(s) themselves.

Block 252 can optionally include sub-block 252A in which the system generates the real environment state data based on sensor-based observation(s) of the real environment. For example, the system can generate pose(s) of real object(s) in the real environment and/or object identifier(s) of the real object(s), by processing the sensor-based observation(s). For instance, in generating the object identifier(s) and/or the pose(s), the system can utilize a perception system to process the sensor-based observation(s) utilizing one or more machine learning model(s).

At block 254, the system configures a simulated environment, of a robotic simulator, based on the real environment state data identified at block 252. The system configures the simulated environment so as to reflect the real environment as closely as possible based on the real environment state data.

At block 256, the system determines, using the robotic simulator, a sequence of robotic actions for a robotic task. The robotic task can be one to be performed imminently by real robot(s) that are currently in the real environment or can be one to performed at a future time (e.g., in 5 minutes) when the real robot(s) are in the real environment. The real environment that is reflected in the simulated environment can be, for example, a part of a room, an entire room, multiple rooms, an entire building, and/or other defined space within the world.

Block 256 can optionally include sub-block 256A, in which the system generates multiple different sequences of robotic actions, separately applies each of the multiple sequences to the robotic simulator with its current configuration (an initial configuration in the initial iteration of sub-block 256A), and determines the sequence based on one or more features from the applying. The feature(s) for a sequence can be determined based on simulated data from application of the sequence and can include, for example, a task success feature and/or efficiency feature(s).

At block 258, the system generates simulated state data instances for the sequence of robotic actions determined at block 256. Each of the simulated state data instances defines, for a corresponding point in the sequence, corresponding anticipated environmental state data and/or robot state data. The system generates a simulated state data instance for a point in the sequence based on simulated state data from that point. For example, a given simulated state data instance that follows implementation of the second robotic action of a sequence can be based on the state of the simulated environment and/or of the state of the simulated robot following implementation of the second robotic action. In some implementations, when block 256 includes sub-block 256A, block 258 can include generating the simulated state data instances based on the applying, of block 256A, for the determined sequence.

At block 260, the system controls the real robot to implement one or more next robotic action(s) in the sequence of robotic actions determined at block 256. At an initial iteration for a sequence, this can include implementing the initial robotic action and optionally one or more following robotic actions. Although not illustrated in FIG. 2, it is noted that in some implementations, before an initial iteration for a sequence, the system can compare a current real state data instance to a simulated state data instance that reflects an anticipated environmental and/or robot state prior to implementation of the sequence. This can ensure the real robot state and/or the real environment state have not changed significantly relative to the initial simulated robot state and/or initial simulated environment state based on which the sequence is determined.

At block 262, the system compares real state data instance(s) to corresponding simulated state data instance(s) generated at block 258. The real state data instance(s) are each generated at a corresponding point after or during implementation of one of the robotic action(s) in a most recent iteration of block 260.

At block 264, the system determines whether the comparison of block 262 indicates a threshold degree of similarity between the real state data instance(s) and the simulated state data instance(s) compared at block 262.

If, at block 264, the system determines the threshold degree of similarity is indicated, the system proceeds to block 266. At block 266, the system determines whether there are one or more remaining robotic actions in the sequence. If so, the system proceeds back to block 260 to control the real robot to implement next robotic action(s) in the sequence. If, at block 266, the system determines there are not remaining robotic actions in the sequence, the system proceeds to block 268.

At block 268, the system determines whether there are more robotic action(s) for completion of the task(s) being performed by the real robot. If not, the system proceeds to block 270 and method 200 ends for the task (but can be initiated again for another task). If so, the system proceeds back to block 256 and determines, using the robotic simulator, a next sequence of robotic actions for the robotic task. It is noted that, in some implementations, a next iteration of block 256 can be performed, in whole or in part, while iterations of block 260 are still being performed based on robotic actions of a sequence determined in an immediately preceding iteration of block 256. It is also noted that in some implementations when block 256 is performed again without encountering block 272 before the performance, the robotic simulator can be in a state that conforms to its state after application of the most recent sequence of robotic actions in the robotic simulator. In some other implementations when block 256 is performed again without encountering block 272 before the performance, the robotic simulator can be in a state that is updated based on updated real environment state data from during or after application of the most recent sequence of robotic actions by the real robot (e.g., poses of simulated object(s) can be updated slightly based on pose(s) from the updated real environment state data).

If, at block 264, the system determines the threshold degree of similarity is not indicated, the system proceeds to block 272. At block 272, the system reconfigures the simulated environment based on updated real environment state data. The updated real environment state data can be based on sensor-based observations of the real environment following a most recent iteration of block 260. Block 272 can share one or more aspects in common with block 254, but be based on the updated real environment state data. After performing block 272, the system can return to block 256 and determine a new sequence of robotic actions, using the robotic simulator and the reconfigured simulated environment.

Figure 3:
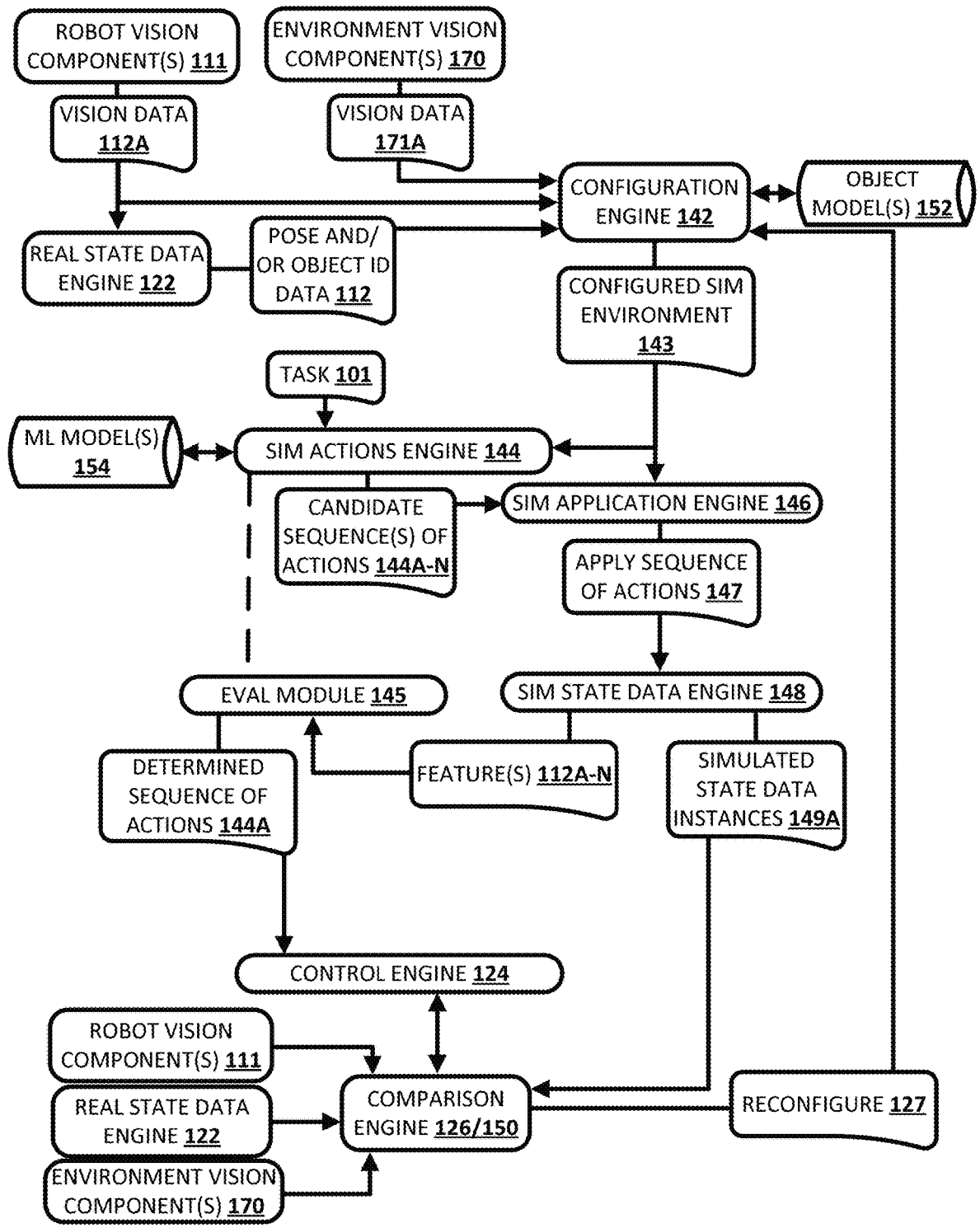
FIG. 3 illustrates an example of various components of FIG. 1, and interactions that can occur between the various components in simulation driven robotic control of a real robot.

Turning now to FIG. 3, various components of FIG. 1 are illustrated, along with example interactions that can occur between the various components in simulation driven robotic control of a real robot. In FIG. 3, robot vision component(s) 111 generate robot vision data 112A and provide the robot vision data 112A to real state data engine 122 and/or to configuration engine 142. Further, environment vision component(s) 170 generate environment vision data 171A and provide the environment vision data 171A to configuration engine 142. Real state data engine 122 can process the robot vision data 112A to generate pose data and/or object identifier data 112 that reflects poses and/or object identifiers for objects in a real environment of the real robot 110 (FIG. 1). The pose data and/or object identifier data 112 is provided to the configuration engine 142.

The configuration engine 142 utilizes the robot vision data 112A, the environment vision data 171A, and/or the pose data and/or object identifier data 112, in generating a configured simulated environment 143. The configuration engine 142 can also utilize object model(s) database 152 in generating the configured simulated environment 143. For example, object identifiers from pose data and/or object identifier data 112 and/or determined based on robot vision data 112A or environment vision data 117A, can be utilized to retrieve corresponding 3D models of objects from the object model(s) database 152. Those 3D models can be included in the configured simulated environment, and can be included at corresponding poses from pose data and/or object identifier data 112 and/or determined based on robot vision data 112A or environment vision data 117A.

The simulated actions engine 144 utilizes the configured simulated environment 143 to determine one or more candidate sequences of robotic actions 144A-N. The simulated actions engine 144 can determine the candidate sequence(s) of robotic actions 144A-N based on processing simulated data utilizing machine learning model(s) 154. Further, the simulated actions engine 144 can determine the candidate sequence(s) of robotic action(s) 144A-N in view of a task 101 to be performed by the real robot. The task 101 can be, for example, based on user interface input from a user and/or based on a higher-level planning system.

The simulated application engine 146 can, for each of the candidate sequences of robotic actions 144A-N, apply the sequence of robotic actions 147 in the robotic simulator. It is noted that, in some implementations, one or more of the downstream robotic actions of one or more of the sequence(s) 144A-N can be generated by the simulated actions engine 144 utilizing updated simulation data from the robotic simulator after the simulated application engine 146 has applied upstream robotic action(s) of the sequence.

The simulated state data engine 148 generates, for each of the candidate sequences of robotic actions 144A-N, and based on the applying the sequence of robotic actions 147 by the simulated application engine, simulated state data. The simulated state data can be utilized to generate corresponding feature(s) 112A-N for each of the candidate sequences of robotic actions 144A-N. The evaluation module 145 can utilize the feature(s) 112A-N in selecting (e.g., from among multiple candidate sequences of robotic actions 144A-N), a determined sequence of robotic actions 144A to provide to the control engine 124 for implementation. The evaluation module 145 can also provide feedback, to simulated actions engine 144, regarding evaluation of already evaluated sequence(s). The simulated actions engine 144 can generate one or more of the candidate sequence(s) of robotic actions 144A-N based on the feedback. For example, the simulated actions engine 144 can initially generate only a single candidate sequence, then generate additional sequence(s) only if the feedback indicates the initially generated sequence fails to satisfy condition(s).

The simulated state data engine 148 also generates simulated state data instances 149A for the determined sequence of robotic actions 144A, and provides the simulated state data instances 149A to the comparison engine 126 or 150.

The control engine 124 implements the determined sequence of robotic actions 144A at the real robot 110. The comparison engine 126 or 150, during the implementation, compares simulated state data instances to real state data instances. The real state data instances can be based on updated vision data from the robot vision component(s) 111, updated vision data form the environment vision component(s) 170, and/or based on updated real state data from the real state data engine 122. If the comparisons indicate a threshold degree of similarity, the implementations of the sequence of robotic actions 144A can continue. If, on the other hand, one or more comparisons do not indicate the threshold degree of similarity, the comparison engine 126 or 150 can cause the control engine 124 to halt implementation of the determined sequence of robotic actions 144A. The comparison engine 126 can further send a reconfigure signal 127 to the reconfiguration engine 142 to cause the simulated environment to be reconfigured as described herein. FIG. 3 is described with respect to a single sequence of robotic actions for the sake of brevity. However, it is noted that in various implementations, in performing a task additional sequences can be determined utilizing the robotic simulator and provided for implementation by the real robot. Those additional sequences can be determined and implemented in a similar manner as described in FIG. 3, and as described elsewhere herein.

Figure 4A:
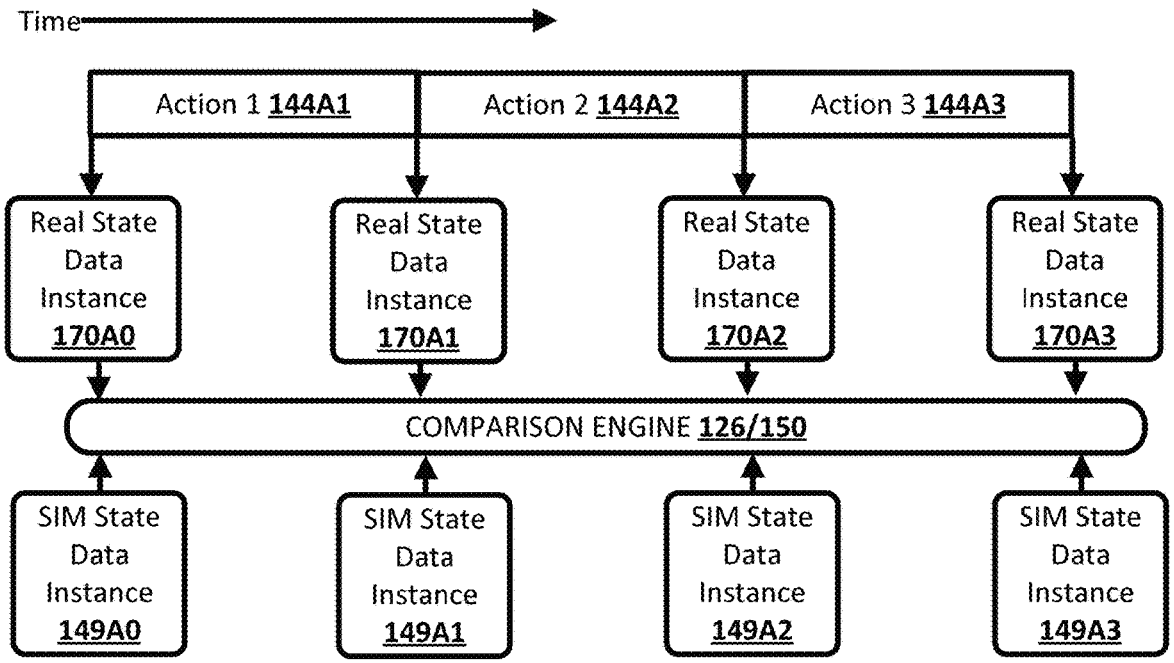
FIG. 4A illustrates an example of comparing, at a first frequency, real state data instances to simulation state data instances, in determining whether to continue control of a real robot based on a sequence of robotic actions determined utilizing a robotic simulator.
Figure 4B:
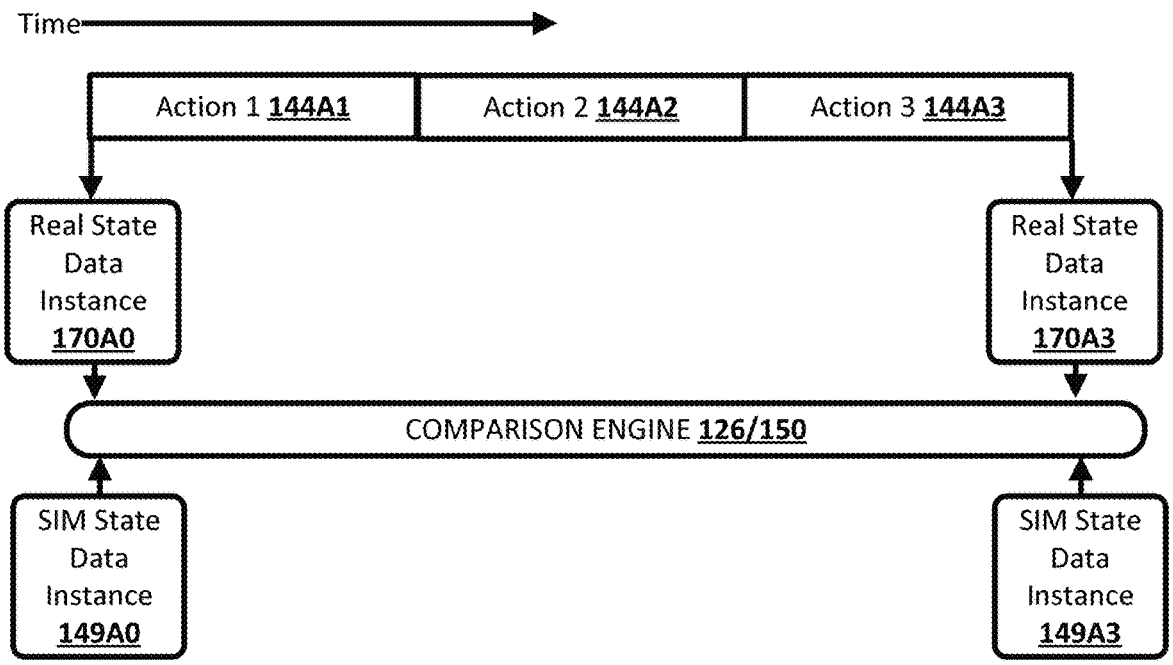
FIG. 4B illustrates an example of comparing, at a second frequency, real state data instances to simulation state data instances, in determining whether to continue control of a real robot based on a sequence of robotic actions determined utilizing a robotic simulator.

Turning now to FIGS. 4A and 4B, two different examples of comparing real state data instances and simulation state data instances are illustrated. In FIG. 4A, three robotic actions 144A1, 144A2, and 144A3 are illustrated, which can be all or part of the robotic actions of a sequence. Further, a simulated state data instance 149A0 is provided and corresponds to an anticipated state before implementation of any of the robotic actions of the sequence. A simulated state data instance 149A1 is provided and corresponds to an anticipated state after implementation of robotic action 144A1, a simulated state data instance 149A2 is provided and corresponds to an anticipated state after implementation of robotic action 144A2, and a simulated state data instance 149A3 is provided and corresponds to an anticipated state after implementation of robotic action 144A3.

In FIG. 4A, the comparison engine 126 or 150 can, prior to implementation of any of the robotic actions of the sequence, compare a real state data instance 170A0 at that time to the simulated state data instance 149A0, and only implement robotic action 144A1 if the comparison indicates a threshold degree of similarity. After implementation of the robotic action 144A1, the comparison engine 126 or 150 can compare a real state data instance 170A1, from a point after implementation of robotic action 144A1, to the simulated state data instance 149A1. Implementation of robotic action 144A2 can be contingent on the comparison indicating a threshold degree of similarity or, alternatively, robotic action 144A2 can be partially (or fully) implemented during the comparison, but control of the real robot based on the sequences halted if the comparison does not indicate the threshold degree of similarity. After implementation of the robotic action 144A2, the comparison engine 126 or 150 can compare a real state data instance 170A2, from a point after implementation of robotic action 144A2, to the simulated state data instance 149A2. Implementation of robotic action 144A3 can be contingent on the comparison indicating a threshold degree of similarity or, alternatively, robotic action 144A3 can be partially (or fully) implemented during the comparison, but control of the real robot based on the sequences halted if the comparison does not indicate the threshold degree of similarity. Further, after implementation of the robotic action 144A3, the comparison engine 126 or 150 can compare a real state data instance 170A3, from a point after implementation of robotic action 144A3, to the simulated state data instance 149A3. Implementation of a further robotic action of the sequence (if any), or of a next sequence of robotic actions (if robotic action 144A3 is a terminal robotic action of the sequence), can be contingent on the comparison indicating a threshold degree of similarity or, alternatively, robotic action 144A3 can be partially (or fully) implemented during the comparison, but control of the real robot based on the sequences halted if the comparison does not indicate the threshold degree of similarity.

FIG. 4B is similar to FIG. 4A and like numbering refers to like components. However, in FIG. 4A simulated state data instances are not provided after each action. Rather, only the initial simulated state data instance 149A0 and the simulated state data instance 149A3 are provided. Accordingly, the comparison engine 126 or 150 will perform the initial comparison between real state data instance 170A0 and simulated state data instance 149A0, as well as the comparison between real state data instance 170A3 and simulated state data instance 149A3—but will not perform comparisons based on real state data after robotic action 144A1 and 144A2. Thus, FIGS. 4A and 4B illustrate two different non-limiting example frequencies at which comparisons can be performed by comparison engine 126 or 150.

In some implementations, the frequency at which comparisons are performed can be fixed throughout the duration of attempted performance of a robotic task and, optionally, can be fixed for each of multiple different robotic tasks. In some alternative implementations, the frequency at which comparisons are performed can be adapted throughout the duration of attempted performance of a robotic task and/or amongst multiple different robotic tasks. In some of those implementations, the frequency at which comparisons are performed at a given time can be determined dependent on actual or anticipated entropy of the real world environment, the part of the robotic task being performed, and/or the robotic task being performed. For example, if upcoming simulated state data instance(s) indicate that the real world environment is likely to change (e.g., due to interaction(s) of the real robot with real world object(s)), the frequency can be increased. On the other hand, if upcoming simulated state data instance(s) indicate that the real world environment is likely to remain static, the frequency can be decreased or a lower frequency maintained. As another example, for a robotic task, or part of a robotic task, that is navigating down an empty hallway, a first frequency can be utilized. On the other hand, for a robotic task, or part of a robotic task, that is attempting to grasp an object, a second frequency can be utilized that is greater than the first frequency. In these and other manners, the frequency of comparisons can be dynamically adapted in dependence on current or anticipated robotic action(s) and/or environmental state. This can include increasing the frequency for complex robotic action(s) (e.g., those that involve interaction with environmental object(s)) and/or high entropy environments, while decreasing the frequency for less complex robotic action(s) (e.g., navigating or moving component(s) without interaction with environmental object(s)) and/or lower entropy environments. Accordingly, the frequency of comparisons can be selectively lowered, resulting in utilization of lesser computational and/or power resources of the real world robot. Further, in some implementations the frequency of generating real state data instances can even be adjusted to reflect the frequency of the comparisons. For example, in some of those implementations real state data instances will only be generated at a frequency that matches the frequency of the comparisons. This can include only processing sensor data instances at that frequency and/or even adapting the sensing frequency of corresponding sensor component(s) based on that frequency. Adapting the sensing frequency of corresponding sensor components can include adapting them to sense at that frequency (if possible) or at a corresponding given frequency that is as close to that frequency as possible and, optionally, greater than that frequency. Adapting the sensing frequency of corresponding sensor component(s) can result in utilization of lesser computational and/or power resources of the real world robot.

Figure 5:
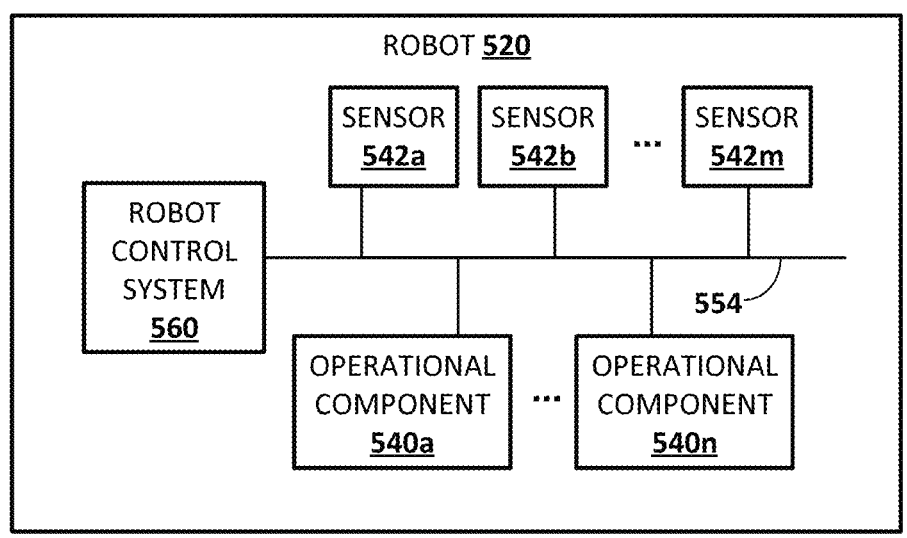
FIG. 5 schematically depicts an example architecture of a robot.

FIG. 5 schematically depicts an example architecture of a robot 520. The robot 520 includes a robot control system 560, one or more operational components 540a-540n, and one or more sensors 542a-542m. The sensors 542a-542m may include, for example, vision sensors, light sensors, pressure sensors, pressure wave sensors (e.g., microphones), proximity sensors, accelerometers, gyroscopes, thermometers, barometers, and so forth. While sensors 542a-m are depicted as being integral with robot 520, this is not meant to be limiting. In some implementations, sensors 542a-m may be located external to robot 520, e.g., as standalone units.

Operational components 540a-540n may include, for example, one or more end effectors and/or one or more servo motors or other actuators to effectuate movement of one or more components of the robot. For example, the robot 520 may have multiple degrees of freedom and each of the actuators may control actuation of the robot 520 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 560 may be implemented in one or more processors, such as a CPU, GPU, and/or other controller(s) of the robot 520. In some implementations, the robot 520 may comprise a "brain box" that may include all or aspects of the control system 560. For example, the brain box may provide real time bursts of data to the operational components 540a-n, with each of the real time bursts comprising a set of one or more control commands that dictate, inter alio, the parameters of motion (if any) for each of one or more of the operational components 540a-n. The control commands can be based on robotic actions determined utilizing a robotic simulator as described herein. In some implementations, the robot control system 560 may perform certain blocks of method 200 of FIG. 2.

Figure 6:
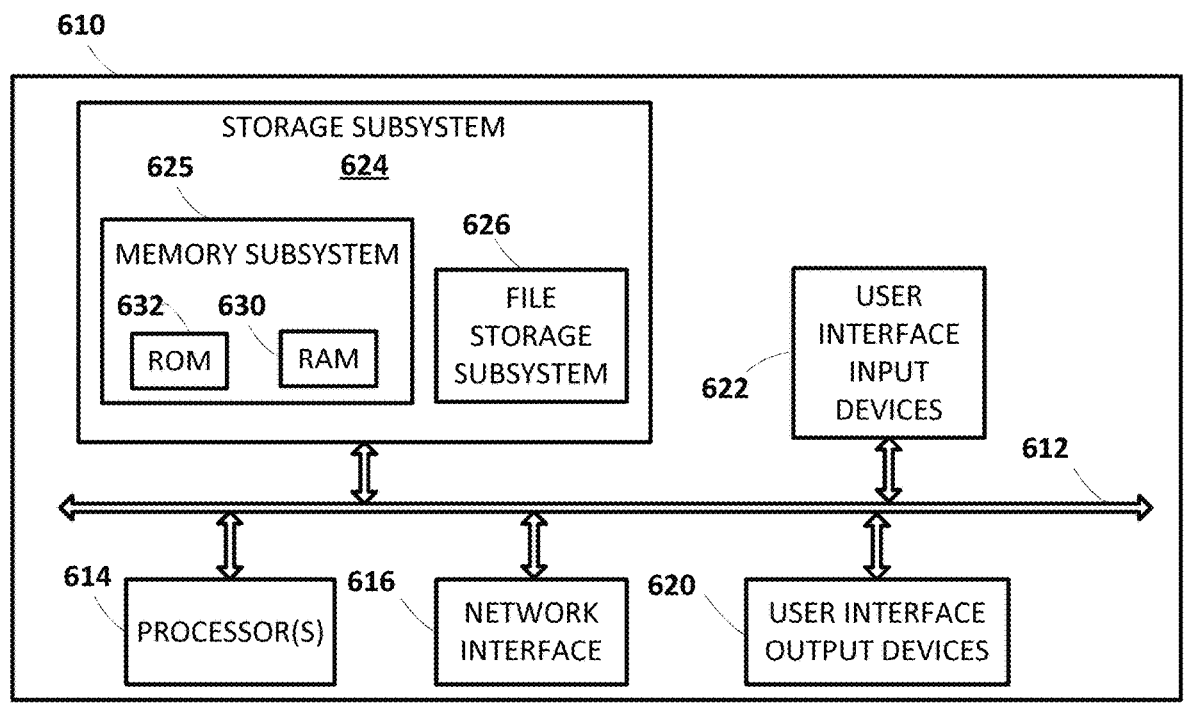
FIG. 6 schematically depicts an example architecture of a computer system.

FIG. 6 is a block diagram of an example computing device 610 that may optionally be utilized to perform one or more aspects of techniques described herein. For example, a robotic simulator can be implemented on computing device 610 or in a cluster of multiple computing device 610. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform certain aspects of the method of FIG. 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In some implementations, a method implemented by one or more processors is provided and includes configuring a simulated environment, of a robotic simulator, based on real environment state data. The real environment state data is based on one or more sensor-based observations of a real environment. The method further includes determining, using the robotic simulator, a sequence of robotic actions for use in controlling a real robot, in the real environment, in performing at least part of a robotic task. The method further includes applying, to a simulated robot of the robotic simulator, the sequence of robotic actions to generate a sequence of simulated state data instances. Each of the simulated state data instances defines, for a corresponding point in the sequence of robotic actions one or both of: corresponding anticipated environmental state data for the corresponding point, and corresponding anticipated robot state data for the corresponding point. The method further includes controlling the real robot to implement a first subset of the sequence of robotic actions, and comparing a real state data instance to a corresponding one of the simulated state data instances for the corresponding point in the sequence of robotic actions. The real state data instance defines, for the corresponding point, one or both of: updated real environment state data, that is based on one or more updated sensor-based observations of the real environment, and real robot state data that is based on one or more sensor-based observations of the real robot. The method further includes, in response to the comparing indicating a threshold degree of similarity between the updated real state data and the corresponding one of the anticipated state data instances for the corresponding point: controlling the real robot to implement a second subset of the sequence of robotic actions.

These and other implementations of the technology disclosed herein can include one or more of the following features.

In some implementations, the method further includes, in response to the comparing not indicating the threshold degree of similarity, halting controlling of the real robot based on the sequence of robotic actions. In some versions of those implementations, the method further includes, in response to the comparing not indicating the threshold degree of similarity: reconfiguring the simulated environment based on updated real environment state data; determining, using the robotic simulator, an updated sequence of robotic actions for use in controlling the real robot in performing the robotic task; applying, to the simulated robot of the robotic simulator, the updated sequence of robotic actions to generate an updated sequence of simulated state data instances; controlling the real robot to implement a first updated subset of the updated sequence of robotic actions; comparing an updated real state data instance to a corresponding updated one of the updated simulated state data instances for the corresponding updated point in the updated sequence of robotic actions; and in response to the comparing, the updated real state data instance to the corresponding updated one of the updated simulated state data instances, indicating the threshold degree of similarity: controlling the real robot to implement an updated second subset of the updated sequence of robotic actions. Each of the updated simulated state data instances defines, for a corresponding updated point in the updated sequence of robotic actions, one or both of: corresponding updated anticipated environmental state data for the corresponding updated point, and real robot state data that is based on one or more sensor-based observations of the real robot In some implementations, the method includes controlling the real robot to implement the second subset of the sequence of robotic actions and to implement any additional subsets of the sequence of robotic actions. In some versions of those implementations, the method further includes, prior to full implementation of the sequence of robotic actions: determining, using the robotic simulator, a next sequence of robotic actions for use in controlling the real robot in performing another part of the robotic task; and applying, to a simulated robot of the robotic simulator and with the simulated robot and the environment of the robot simulator corresponding to a terminal one of the simulated state data instances, the next sequence of robotic actions to generate a next sequence of simulated state data instances. In some of those versions, the method further includes, after full implementation of the sequence of robotic actions, controlling the real robot to implement the next sequence or robotic actions. Controlling the real robot to implement the next sequence of robotic actions can include: controlling the real robot to implement a first next subset of the next sequence of robotic actions; comparing a next real state data instance to a corresponding one of the next simulated state data instances; and, in response to the comparing indicating the threshold degree of similarity, controlling the real robot to implement a second next subset of the next sequence of robotic actions.

In some implementations, the one or more sensor-based observations include robot-sensor-based observations that are based on one or more real sensors of the real robot.

In some implementations, the one or more sensor-based observations include environment-sensor-based observations that are based on one or more real sensors that are not coupled to the real robot, but are in the real environment.

In some implementations, determining the sequence of robotic actions for use in controlling the real robot in performing at least part of the robotic task, includes: applying an alternate sequence of robotic actions to the robotic simulator; comparing one or more alternate features, from the applying the alternate sequence of robotic actions to the robotic simulator, to one or more features, from the applying the sequence of robotic actions to the robotic simulator; and determining, based on the comparing the one or more alternate features to the one or more features, to utilize the sequence of robotic actions, in lieu of the alternate sequence of robotic actions, for use in controlling the real robot in performing at least part of the robotic task. In some versions of those implementations, the one or more features include one or both of a task success feature and an efficiency feature, and the one or more alternate features comprise one or both of an alternate task success feature and an alternate efficiency feature. In some of those versions the one or more features include the task success feature and the method further includes generating the task success feature based on a terminal state, of the robotic simulator, after applying the sequence of robotic actions. Further, in some of those versions the one or more features additionally or alternative include the efficiency feature, and the method further includes generating the efficiency feature based on one or both of: a quantity of robotic actions in the sequence of robotic actions, and a distance traversed by one or more simulated components, of the simulated robot, in performing the sequence of robotic actions.

In some implementations, comparing the real state data instance to the corresponding one of the simulated state data instances for the corresponding point is performed by one or more processors of the real robot.

In some implementations, the robotic simulator is implemented on one or more remote processors that are remote from, but in network communication with, the real robot.

In some implementations, a method implemented by one or more processors of a real robot is provided and includes receiving a sequence of robotic actions and a sequence of simulated state data instances. Each of the simulated state data instances defines, for a corresponding point in the sequence of robotic actions one or both of: corresponding anticipated environmental state data for the corresponding point, and corresponding anticipated robot state data for the corresponding point. The method further includes controlling the real robot to implement a first subset of the sequence of robotic actions, and comparing a real state data instance to a corresponding one of the simulated state data instances for the corresponding point in the sequence of robotic actions. The real state data instance defines, for the corresponding point, one or both of: updated real environment state data, that is based on one or more updated sensor-based observations of the real environment, and real robot state data that is based on one or more sensor-based observations of the real robot. The method further includes, in response to the comparing indicating a threshold degree of similarity between the updated real state data and the corresponding one of the anticipated state data instances for the corresponding point: controlling the real robot to implement a second subset of the sequence of robotic actions.

These and other implementations of the technology disclosed herein can include one or more of the following features.

In some implementations, the method further includes, in response to the comparing not indicating the threshold degree of similarity, halting controlling of the real robot based on the sequence of robotic actions.

In some implementations, the method further includes, in response to the comparing not indicating the threshold degree of similarity: transmitting, to a robotic simulator component, the updated real environment state data; receiving, from the robotic simulator component, an updated sequence of robotic actions that is generated based on the updated real environment state data and an updated sequence of simulated state data instances; controlling the real robot to implement a first updated subset of the updated sequence of robotic actions; comparing an updated real state data instance to a corresponding updated one of the updated simulated state data instances for the corresponding updated point in the updated sequence of robotic actions; and in response to the comparing, the updated real state data instance to the corresponding updated one of the updated simulated state data instances, indicating the threshold degree of similarity: controlling the real robot to implement an updated second subset of the updated sequence of robotic actions.

In some implementations, the robotic simulator is implemented on one or more remote processors that are remote from, but in network communication with, the real robot.

In some implementations, a method implemented by one or more processors is provided and includes configuring a simulated environment, of a robotic simulator, based on real environment state data that is based on one or more sensor-based observations of a real environment. The method further includes determining, using the robotic simulator, a first candidate sequence of robotic actions and a second candidate sequence of robotic actions, for use in controlling a real robot, in the real environment, in performing at least part of a robotic task. The method further includes applying, to a simulated robot of the robotic simulator and with the simulated environment after the configuring, the first candidate sequence of robotic actions to generate first simulated state data, and applying, to the simulated robot of the robotic simulator and with the simulated environment after the configuring, the second candidate sequence of robotic actions to generate second simulated state data. The method further includes determining, based on the first simulated state data and the second simulated state data, to utilize the first candidate sequence of robotic actions, in lieu of the second candidate sequence of robotic actions, for use in controlling the real robot in performing at least part of the robotic task. The method further includes, in response to determining to utilize the first candidate sequence of robotic actions, causing the real robot to implement the first candidate sequence of robotic actions.

These and other implementations of the technology disclosed herein can include one or more of the following features.

In some implementations, determining, based on the first simulated state data and the second simulated state data, to utilize the first candidate sequence of robotic actions, in lieu of the second candidate sequence of robotic actions, includes: generating or more first features based on the first simulated data; generating or more second features based on the second simulated data; and determining to utilize the first candidate sequence of robotic actions based on comparing the first features to the second features. In some versions of those implementations, the one or more first features include one or both of a first task success feature and a first efficiency feature, and wherein the one or more second features include one or both of a second task success feature and second efficiency feature.

In some implementations, a method implemented by one or more processors is provided and includes configuring a simulated environment, of a robotic simulator, based on real environment state data that is based on one or more sensor-based observations of a real environment. The method further includes determining, using the robotic simulator, a first candidate sequence of robotic actions and a second candidate sequence of robotic actions, for use in controlling a real robot, in the real environment, in performing at least part of a robotic task. Determining the first candidate sequence includes utilizing simulated state data that simulates real state data that is fully incapable of being generated utilizing any sensors in the real environment. The method further includes causing the real robot to implement the first candidate sequence of robotic actions.

These and other implementations of the technology disclosed herein can include one or more of the following features.

In some implementations, the simulated state data simulates the real state data that is fully incapable of being generated utilizing any sensors in the real environment by being generated from a simulated viewpoint and none of any sensors in the real environment being capable of capturing real vision data from a corresponding real viewpoint, in the real environment, without human intervention.

In some implementations, the simulated state data simulates the real state data that is fully incapable of being generated utilizing any sensors in the real environment by being generated from a simulated sensor of a particular type and none of any sensors in the real environment being of the particular type.

Other implementations may include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described herein. Yet other implementations may include a system of one or more computers and/or one or more robots that include one or more processors operable to execute stored instructions to perform a method such as one or more of the methods described herein.

What is claimed is:

1. A method implemented by one or more processors, the method comprising:
   configuring a simulated environment, of a robotic simulator, based on real environment state data that is based on one or more sensor-based observations of a real environment;
   determining, using the robotic simulator, a sequence of robotic actions for use in controlling a real robot, in the real environment, in performing at least part of a robotic task;
   applying, to a simulated robot of the robotic simulator, the sequence of robotic actions to generate a sequence of simulated state data instances, wherein each of the simulated state data instances defines, for a corresponding point in the sequence of robotic actions one or both of:
   corresponding anticipated environmental state data for the corresponding point, and
   corresponding anticipated robot state data for the corresponding point;
   subsequent to determining the sequence of robotic actions:
   controlling the real robot to implement a first subset of the sequence of robotic actions;

comparing, during or after controlling the real robot to implement the first subset of the sequence of robotic actions, a real state data instance to a corresponding one of the simulated state data instances for the corresponding point in the sequence of robotic actions, the real state data instance defining, for the corresponding point, one or both of:

updated real environment state data, that is based on one or more updated sensor-based observations of the real environment, and real robot state data that is based on one or more sensor-based observations of the real robot; and in response to the comparing indicating a threshold degree of similarity between the updated real state data and the corresponding one of the anticipated state data instances for the corresponding point:

controlling the real robot to implement a second subset of the sequence of robotic actions, wherein controlling the real robot to fully implement the second subset of the sequence of robotic actions is contingent on the comparing indicating the threshold degree of similarity between the updated real state data and the corresponding one of the anticipated state data instances for the corresponding point.

2. The method of claim 1, further comprising:

in response to the comparing not indicating the threshold degree of similarity:

halting controlling of the real robot based on the sequence of robotic actions.

3. The method of claim 2, further comprising, in response to the comparing not indicating the threshold degree of similarity:

reconfiguring the simulated environment based on updated real environment state data;

determining, using the robotic simulator, an updated sequence of robotic actions for use in controlling the real robot in performing the robotic task;

applying, to the simulated robot of the robotic simulator, the updated sequence of robotic actions to generate an updated sequence of simulated state data instances, wherein each of the updated simulated state data instances defines, for a corresponding updated point in the updated sequence of robotic actions, one or both of:

corresponding updated anticipated environmental state data for the corresponding updated point, and real robot state data that is based on one or more sensor-based observations of the real robot;

controlling the real robot to implement a first updated subset of the updated sequence of robotic actions;

comparing an updated real state data instance to a corresponding updated one of the updated simulated state data instances for the corresponding updated point in the updated sequence of robotic actions;

in response to the comparing, the updated real state data instance to the corresponding updated one of the updated simulated state data instances, indicating the threshold degree of similarity:

controlling the real robot to implement an updated second subset of the updated sequence of robotic actions.

4. The method of claim 1, wherein the method includes controlling the real robot to implement the second subset of the sequence of robotic actions and to implement any additional subsets of the sequence of robotic actions.

5. The method of claim 4, further comprising:

prior to full implementation of the sequence of robotic actions:

determining, using the robotic simulator, a next sequence of robotic actions for use in controlling the real robot in performing another part of the robotic task; and applying, to a simulated robot of the robotic simulator and with the simulated robot and the environment of the robot simulator corresponding to a terminal one of the simulated state data instances, the next sequence of robotic actions to generate a next sequence of simulated state data instances; and after full implementation of the sequence of robotic actions:

controlling the real robot to implement the next sequence or robotic actions.

6. The method of claim 5, wherein controlling the real robot to implement the next sequence of robotic actions comprises:

controlling the real robot to implement a first next subset of the next sequence of robotic actions;

comparing a next real state data instance to a corresponding one of the next simulated state data instances;

in response to the comparing indicating the threshold degree of similarity:

controlling the real robot to implement a second next subset of the next sequence of robotic actions.

7. The method of claim 1, wherein the one or more sensor-based observations comprise robot-sensor-based observations that are based on one or more real sensors of the real robot.

8. The method of claim 1, wherein the one or more sensor-based observations comprises environment-sensor-based observations that are based on one or more real sensors that are not coupled to the real robot, but are in the real environment.

9. The method of claim 1, wherein determining the sequence of robotic actions for use in controlling the real robot in performing at least part of the robotic task, comprises:

applying an alternate sequence of robotic actions to the robotic simulator;

comparing:

one or more alternate features, from the applying the alternate sequence of robotic actions to the robotic simulator, to one or more features, from the applying the sequence of robotic actions to the robotic simulator; and determining, based on the comparing the one or more alternate features to the one or more features, to utilize the sequence of robotic actions, in lieu of the alternate sequence of robotic actions, for use in controlling the real robot in performing at least part of the robotic task.

10. The method of claim 9, wherein the one or more features comprise one or both of a task success feature and an efficiency feature, and wherein the one or more alternate features comprise one or both of an alternate task success feature and an alternate efficiency feature.

11. The method of claim 10, wherein the one or more features comprise the task success feature and further comprising generating the task success feature based on a terminal state, of the robotic simulator, after applying the sequence of robotic actions.

12. The method of claim 10, wherein the one or more features comprise the efficiency feature, and further comprising generating the efficiency feature based on one or both of:

a quantity of robotic actions in the sequence of robotic actions, and a distance traversed by one or more simulated components, of the simulated robot, in performing the sequence of robotic actions.

13. The method of claim 1, wherein comparing the real state data instance to the corresponding one of the simulated state data instances for the corresponding point is performed by one or more processors of the real robot.

14. The method of claim 1, wherein the robotic simulator is implemented on one or more remote processors that are remote from, but in network communication with, the real robot.

15. The method of claim 1, wherein each of the simulated state data instances defines, for the corresponding point in the sequence of robotic actions, the corresponding anticipated environmental state data for the corresponding point.

16. A method implemented by one or more processors of a real robot, the method comprising:
  receiving a sequence of robotic actions and a sequence of simulated state data instances,
    wherein each of the simulated state data instances defines, for a corresponding point in the sequence of robotic actions one or both of:
    corresponding anticipated environmental state data for the corresponding point, and
    corresponding anticipated robot state data for the corresponding point;
  subsequent to receiving the sequence of robotic actions and the sequence of simulated state data instances:
  controlling the real robot to implement a first subset of the sequence of robotic actions;
  comparing, during or after controlling the real robot to implement the first subset of the sequence of robotic actions, a real state data instance to a corresponding one of the simulated state data instances for the corresponding point in the sequence of robotic actions, the real state data instance defining, for the corresponding point, one or both of:
    updated real environment state data, that is based on one or more updated sensor-based observations of the real environment, and
    real robot state data that is based on one or more sensor-based observations of the real robot; and
  in response to the comparing indicating a threshold degree of similarity between the updated real state data and the corresponding one of the anticipated state data instances for the corresponding point:
    controlling the real robot to implement a second subset of the sequence of robotic actions,
    wherein controlling the real robot to fully implement the second subset of the sequence of robotic actions is contingent on the comparing indicating the threshold degree of similarity between the updated real state data and the corresponding one of the anticipated state data instances for the corresponding point.

17. The method of claim 16, further comprising:
  in response to the comparing not indicating the threshold degree of similarity:
    halting controlling of the real robot based on the sequence of robotic actions.

18. The method of claim 17, further comprising, in response to the comparing not indicating the threshold degree of similarity:
  transmitting, to a robotic simulator component, the updated real environment state data;
  receiving, from the robotic simulator component, an updated sequence of robotic actions that is generated based on the updated real environment state data and an updated sequence of simulated state data instances, wherein each of the updated simulated state data instances defines, for a corresponding updated point in the updated sequence of robotic actions, one or both of:
    corresponding updated anticipated environmental state data for the corresponding updated point, and
    real robot state data that is based on one or more sensor-based observations of the real robot;
  controlling the real robot to implement a first updated subset of the updated sequence of robotic actions;
  comparing an updated real state data instance to a corresponding updated one of the updated simulated state data instances for the corresponding updated point in the updated sequence of robotic actions;
  in response to the comparing, the updated real state data instance to the corresponding updated one of the updated simulated state data instances, indicating the threshold degree of similarity:
    controlling the real robot to implement an updated second subset of the updated sequence of robotic actions.

19. The method of claim 18, wherein the robotic simulator is implemented on one or more remote processors that are remote from, but in network communication with, the real robot.

20. A system, comprising:
  one or more environment sensors capturing sensor-based observations of a real environment;
  robot actuators;
  one or more real robot control processors executing robot instructions to:
  receive a sequence of robotic actions and a sequence of simulated state data instances,
    wherein the sequence or robotic actions are generated by one or more robotic simulator processors and based on the sensor-based observations of the real environment, and
    wherein each of the simulated state data instances is generated by the one or more robotic simulator processors and defines, for a corresponding point in the sequence of robotic actions one or both of:
    corresponding anticipated environmental state data for the corresponding point, and
    corresponding anticipated robot state data for the corresponding point;
  subsequent to receiving the sequence of robotic actions and the sequence of simulated state data instances:
  control the robot actuators to implement a first subset of the sequence of robotic actions;
  compare, during or after controlling the real robot to implement the first subset of the sequence of robotic actions, a real state data instance to a corresponding one of the simulated state data instances for the corresponding point in the sequence of robotic actions, the real state data instance defining, for the corresponding point, one or both of:
    updated real environment state data, that is based on one or more updated sensor-based observations of the real environment, and
    real robot state data that is based on one or more sensor-based observations of the real robot; and
  in response to the comparing indicating a threshold degree of similarity between the updated real state data and the corresponding one of the anticipated state data instances for the corresponding point:

control the robot actuators to implement a second subset of the sequence of robotic actions,
wherein control of robot actuators to fully implement the second subset of the sequence of robotic actions is contingent on the comparing indicating the threshold degree of similarity between the updated real state data and the corresponding one of the anticipated state data instances for the corresponding point.

21. The system of claim 20, further comprising:
the one or more robotic simulator processors, wherein the one or more robotic simulator processors execute simulator instructions to:
configure a simulated environment, of a robotic simulator, based on real environment state data that is based on the sensor-based observations;
determine a sequence of robotic actions for use in controlling a real robot, in the real environment, in performing at least part of a robotic task; and
apply, to a simulated robot of the robotic simulator, the sequence of robotic actions to generate the sequence of simulated state data instances.

* * * * *